3,442,726
PARTICULATE NITRONIUM PERCHLORATE COATED WITH A COMPLEX PYRIDINE SALT

Thomas P. Rudy, Saratoga, and Toshio William Nakagawa, San Jose, Calif., assignors to United Aircraft Corporation, East Hartford, Conn., a corporation of Delaware
No Drawing. Filed Sept. 27, 1963, Ser. No. 311,957
Int. Cl. C06b *15/02, 19/02*
U.S. Cl. 149—7     2 Claims This invention relates to a solid propellant oxidizer composition and, more particularly, to complex salts of nitronium perchlorate and pyridine or oxidation-resistant pyridine derivatives and processes for the preparation thereof.

Recently, considerable effort has been made in the solid propulsion industry to incorporate nitronium perchlorate into propellant formulations. However, difficulty has been experienced in using nitronium perchlorate in the various state-of-the-art propellant binders because of the reactive nature of nitronium perchlorate, particularly in the presence of water and other impurities. For example, when nitronium perchlorate comes into contact with water, it hydrolyzes to form nitric and perchloric acids which will attack the binder to degrade its physical properties. A variety of functional groups (e.g. olefinic double bonds, aromatic rings, as well as hydroxyl, carbonyl, ether, epoxide, and amino groups) which are characteristic of most elastomeric binders are attacked by the above mentioned hydrolysis products and, in some instances, by pure nitronium perchlorate in the total absence of water. The result of such attack is both degradation of the elastic properties of the binder and destruction of the nitronium perchlorate. To avoid the aforementioned problems, efforts have been made to coat the particles of nitronium perchlorate with waterproofing compositions comprised, principally, of plastic-base materials. However, the thickness of these coatings is such as to comprise a substantial portion of the total mass of the oxidizer thereby reducing the efficiency of the system.

The present invention overcomes the problem of nitronium perchlorate incompatibility in solid propellant systems by forming a compatible complex salt of nitronium perchlorate and pyridine or an oxidation-resistant pyridine derivative. It has been found that by complexing nitronium perchlorate with pyridine or an oxidation-resistant pyridine derivative, a salt is formed which is substantially inert with respect to most organic functional groups and which reacts at a substantially reduced rate with water to form relatively innocuous products.

It is an object, therefore, of the present invention to provide a new composition of matter which constitutes a complex salt of nitronium perchlorate with pyridine or oxidation-resistant pyridine derivatives.

It is a further object of this invention to provide a new composition of matter which is an excellent oxidizer for use in a solid propellant.

It is still a further object of the invention to provide a complex of nitronium perchlorate which is compatible with solid propellant formulations.

Accordingly, the present invention provides an oxidizer phase for solid propellant systems comprised of a complex of nitronium perchlorate with pyridine or oxidation-resistant pyridine derivatives. It has been found that by combining liquid pyridine with solid nitronium perchlorate, a complex salt is formed wherein the mole ratio of pyridine to nitronium perchlorate is approximately 1.5 to 1. The formation of the complex is shown by the following equation:

$$\underset{\text{(Liquid)}}{C_5H_5N} + \underset{\text{(Solid)}}{NO_2ClO_4} \longrightarrow \underset{\text{(Solid)}}{(C_5H_5N)_{1.5}\cdot NO_2ClO_4}$$

In order to prepare the complex, it is necessary to conduct the reaction under an atmosphere having a dew point of approximately —100° F. Pure, dry pyridine in excess (i.e. molar ratio of pyridine to nitronium perchlorate greater than 1.5:1) is added to pure, finely divided nitronium perchlorate, and the mixture is allowed to stand at 25° C. until the reaction is complete (5–30 minutes). The novel complex salt of the present invention is recovered in pure form by removal of excess pyridine at room temperature by distillation under reduced pressure.

It has also been found that complex-salts of nitronium perchlorate and pyridine can be formed which possess a greater proportion of nitronium perchlorate, whereby the quantity of pyridine added to the system is markedly reduced. For example, an improved ratio of pyridine to nitronium perchlorate, can be formed by mixing the same basic ingredients referred to above in a solution of tetramethylene sulfone. Although the exact structural formula of the resulting complex salt is not known, it has been found that the mole ratio of pyridine to nitronium perchlorate is 1 to 1.

It has been found that by treating nitronium perchlorate particles with certain derivatives of pyridine, for instance long chain alkylpyridines or pyridine-substituted polymers, an extremely thin surface layer of the pyridine derivative nitronium perchlorate complex is formed thereon. It is believed that the thickness of the complex salt which results is on the order of one molecular thickness resulting, therefore, in a novel surface passivation technique for particles of nitronium perchlorate. Because of the extreme thinness of the coating, the quantity of extraneous matter added to the system is insignificant.

Having described the novel composition of the present invention in a general manner, the following examples are provided wherein one skilled in the art may readily reproduce the aforementioned desired results.

EXAMPLE 1

A pyridine-nitronium perchlorate complex possessing a mole ratio of 1.5:1 is prepared as follows:

Analytical grade pyridine is dried by refluxing several hours with barium oxide and is further purified by fractional distillation. Approximately 5 gm. (0.063 mole) of the purified pyridine is transferred to a vessel containing approximately 0.25 gm. of barium oxide which vessel is equipped with a stopcock and ground joint to permit attachment to a high vacuum manifold. The vessel is then connected to a vacuum manifold whereupon the contents are degassed by cooling the vessel to —80° C. and evacuating to a pressure of $10^{-3}$ mm. Hg. After isolating the vessel and its contents by means of the stopcock, the vessel is allowed to come to room temperature.

Under an anhydrous atmosphere approximately 0.3 gm. of finely divided nitronium perchlorate (1–5 micron particle size) is placed in a vessel identical to that containing the pyridine. The nitronium perchlorate is dried and purified by being maintained at 45° C. for 16 hours under a pressure of $10^{-5}$ mm. Hg. This treatment results in a loss of weight of about 0.05 gm., leaving approximately 0.25 gm. (0.0172 mole) of pure, dry nitronium perchlorate.

The reaction is conducted by connecting the two evacuated vessels by way of the manifold and cooling the vessel containing the nitronium perchlorate to −80° C. All of the pyridine from the other vessel, which is not subjected to external cooling, is thereby condensed in the cooled vessel. The latter vessel is isolated from the manifold by closing the stopcock and the reaction mixture is allowed to warm to 25° C. where it is maintained for approximaately 10 minutes or until no further change in the crystalline structure of the solid material occurs.

The bulk of excess pyridine is removed from the reaction vessel by opening its stopcock and cooling the pyridine vessel to −80° C. The solid, crystalline reaction product is freed of remaining pyridine by application of vacuum until the vapor pressure falls below $10^{-3}$ mm. Hg at room temperature.

The yield of complex salt of composition $$(C_5H_5N)_{1.5}NO_2ClO_4$$

is quantitative based on purified nitronium perchlorate starting material.

The indicated composition of the complex salt is established by gravimetric determination of the combining ratio of pyridine to nitronium perchlorate: calculated, 1.5:1; found 1.495:1. In sharp contrast to the extremely vigorous reaction of nitronium perchlorate with water, the complex salt dissolves slowly in water at 25° C. and hydrolyzes to form a mixture of nitric and perchloric acids and pyridine (the latter in the form of pyridinium salts). Titration of the acidic mixture with standardized base to the end point at pH=8 gives an equivalent weight of 134 for the complex salt (calculated, 132.1) and converts the pyridinium ion to free pyridine.

The infrared spectrum of the complex salt in tetramethylene sulfone solution or as a mull in a polymeric halocarbon (Kel-F 90 grease) shows none of the absorptions of nitronium perchlorate. The spectrum does show two strong, unique absorptions at 1608 cm.$^{-1}$ and 1725 cm.$^{-1}$.

That the complex salt is relatively inert is shown by the total lack of reaction with the olefin octadecene-1 during a 24 hour period at 25° C. In contrast, nitronium perchlorate reacts immediately and explosively under identical conditions.

Differential thermal analysis at a heating rate of 5° C./min. indicates that the complex salt is stable below 90° C. Its impact sensitivity is approximately 20 kg. cm. when determined by means of an Olin-Mathieson drop weight tester with a 2 kg. weight. Exposure of the complex salt to atmospheric moisture increases both thermal and impact stability.

EXAMPLE 2

In order to passivate the surface of nitronium perchlorate crystals, the crystals may be complexed with pyridine derivatives such as octadecyl nicotinate. Accordingly, under an anhydrous atmosphere, 0.300 gm. of coarse (14–20 mesh) crystalline nitronium perchlorate is placed in a reaction vessel equipped with stopcock, means for attachment to a vacuum line, and a rubber septum. After evacuating the vessel to a pressure of $10^{-5}$ mm. Hg, the stopcock is closed, and approximately 0.25 ml. of dry carbon tetrachloride is added to the nitronium perchlorate by hypodermic injection through the rubber septum. This is followed by similar injection of 0.5 ml. of a solution containing 0.028 gm. of pure octadecyl nicotinate in dry carbon tetrachloride. After a reaction period of 10 minutes, the carbon tetrachloride is removed at room temperature by application of vacuum until the system pressure is decreased to $10^{-5}$ mm. Hg.

The passivated nitronium perchlorate crystals show a reduced rate of reaction with atmospheric moisture. After 10 minutes exposure to air of 40 percent relative humidity at 25° C. the passivated crystals are unchanged in weight while a control sample of untreated nitronium perchlorate crystals increases in weight by 0.5 percent. Furthermore, the passivated crystals exhibit improved compatibility with a variety of uncured propellant binders as judged by lack of visible coloration and gas evolution.

EXAMPLE 3

A pyridine-nitronium perchlorate complex having a mole ratio of 1:1 is prepared as follows:

Under an anhydrous atmosphere 0.5 ml. of a 0.6 molar solution of pyridine in tetramethylene sulfone is added to an equal volume of a 0.6 molar solution of nitronium perchlorate in the same solvent. To the stirred mixture is added 25 ml. of chloroform. The resulting white precipitate is collected on a fritted glass filter, washed several times with fresh chloroform, and dried in vacuo to produce a complex salt having the empirical formula $C_5H_5N.NO_2ClO_4$.

The 1:1 stoichiometry of this complex salt is established by hydrolysis and titration in the manner described under Example 1.

The infrared spectrum of the 1:1 complex salt in tetramethylene sulfone solution or as a mull in a polymeric halocarbon (Kel-F 90 grease) is identical to that of the 1.5:1 complex in the range 1500–2700 cm.$^{-1}$ with the following exception. The 1:1 complex salt does not exhibit the absorption maximum at 1585 cm.$^{-1}$ shown by the previously described 1.5:1 complex salt, which absorption is due to pyridine. This evidence suggests that each mole of 1.5:1 complex salt contains one mole of chemically combined pyridine and an additional half-mole of pyridine as solvent of crystallization.

Having thus described the invention, it will be obvious to those skilled in the art that the new compositions of matter hereinabove disclosed can be used for applications other than propellant formulation. The complex salts as herein disclosed may be employed, for example, in chemical processes where it is desired to use nitronium compounds, but their use is prohibited because of their reactive nature.

Obviously many modifications and variations of the present invention are possible in light of the above teachings. The examples set forth are not intended as limitations to the invention as many alternative formulations producing the same novel complex salt may be employed for practice of the present invention. It is therefore, to be understood that within the scope of the appended claims the invention may be practiced otherwise than as specifically described.

We claim:
1. Particulate matter comprised of a core of nitronium perchlorate coated with a surface layer of a complex pyridine salt, said complex pyridine salt formed from nitronium perchlorate and a component selected from the group consisting of pyridine and oxidation-resistant pyridine derivatives.

2. A solid propellant formulation comprising a fuel constituent and an oxidizer constituent in intimate admixture the improvement that a predetermined quantity of the oxidizer constituent is comprised of nitronium perchlorate particles coated with a surface layer of a complex pyridine salt, said complex pyridine salt formed from said nitronium perchlorate and a component selected from the group consisting of pyridine and oxidation-resistant pyridine derivatives.

References Cited

UNITED STATES PATENTS

| | | | |
|---|---|---|---|
| 2,961,444 | 11/1960 | Aftandilian | 260—290 |
| 2,909,525 | 10/1959 | Fand | 260—290 |
| 3,039,903 | 6/1962 | Enoksson | 149—7 |
| 3,005,692 | 10/1961 | Adelman | 149—7 |

BENJAMIN R. PADGETT, *Primary Examiner.*

U.S. Cl. X.R.

149—19, 20, 75